US011389773B2

(12) United States Patent
Qiu et al.

(10) Patent No.: US 11,389,773 B2
(45) Date of Patent: Jul. 19, 2022

(54) METHOD FOR MANUFACTERING PRODUCT IN THE FORM OF SHEET OR BLOCK AND PRODUCTION DEVICE THEREOF

(71) Applicant: VEEGOO TECHNOLOGY CO., LTD., Foshan (CN)

(72) Inventors: Jianping Qiu, Foshan (CN); Zhongyuan Li, Foshan (CN); Shiyang Zhu, Foshan (CN)

(73) Assignee: VEEGOO TECHNOLOGY CO., LTD., Foshan (CN)

( * ) Notice: Subject to any disclaimer, the term of this patent is extended or adjusted under 35 U.S.C. 154(b) by 526 days.

(21) Appl. No.: 16/327,740

(22) PCT Filed: Aug. 22, 2017

(86) PCT No.: PCT/CN2017/098474
§ 371 (c)(1),
(2) Date: Feb. 22, 2019

(87) PCT Pub. No.: WO2018/036476
PCT Pub. Date: Mar. 1, 2018

(65) Prior Publication Data
US 2019/0176113 A1 Jun. 13, 2019

(30) Foreign Application Priority Data

Aug. 24, 2016 (CN) .......................... 201610714560.2

(51) Int. Cl.
*B22C 5/00* (2006.01)
*B01F 33/82* (2022.01)
(Continued)

(52) U.S. Cl.
CPC .......... *B01F 33/821* (2022.01); *B01F 27/119* (2022.01); *B01F 27/191* (2022.01);
(Continued)

(58) Field of Classification Search
CPC .................................................. B01F 13/1027
See application file for complete search history.

(56) References Cited

U.S. PATENT DOCUMENTS 4,023,776 A * 5/1977 Greten ..................... B27N 3/14
366/153.2
4,164,597 A * 8/1979 Smith ..................... B28C 5/365
366/186
(Continued)

FOREIGN PATENT DOCUMENTS

CN 201719997 U 1/2011
CN 103522402 1/2014
(Continued)

OTHER PUBLICATIONS

Google translation for KR100773067B1 (Year: 2007).*
(Continued)

*Primary Examiner* — Anshu Bhatia
*Assistant Examiner* — Gregory Y Huan
(74) *Attorney, Agent, or Firm* — Hamre, Schumann, Mueller & Larson, P.C.

(57) ABSTRACT

A method for manufacturing a product in the form of a sheet or a block, including: preparing an initial mixture including one or more stones or a stone-like granular material having a selected particle size and a binder; depositing a layer of the initial mixture having a predetermined thickness onto a surface of a conveyor belt; performing prepressing and finally obtaining a roughly formed material; systematically depositing layers of initial mixtures onto surface of the conveyor belt in parallel, making each layer not superposed in a direction perpendicular to surface of the conveyor belt, but arranged in sequence in a direction of width of the conveyor belt to form a multi-component or composite mixture structure; conveyor belt conveys the multi-component or composite mixture into a rotated container or support member; after discharged from the rotated container or support member, a final mixture is conveyed to perform subsequent pre-compression and hardening.

8 Claims, 4 Drawing Sheets

(51) Int. Cl.
  *B01F 27/60*   (2022.01)
  *B01F 27/119*  (2022.01)
  *B01F 27/191*  (2022.01)
  *B01F 29/80*   (2022.01)
  *B01F 33/80*   (2022.01)
  *B01F 33/85*   (2022.01)
  *B01F 35/71*   (2022.01)

(52) U.S. Cl.
  CPC .............. *B01F 27/60* (2022.01); *B01F 29/80* (2022.01); *B01F 33/80* (2022.01); *B01F 33/85* (2022.01); *B01F 35/71* (2022.01); *B01F 35/71705* (2022.01); *B01F 33/834* (2022.01)

(56) References Cited

U.S. PATENT DOCUMENTS

| | | | |
|---|---|---|---|
| 8,444,892 B2 | 5/2013 | Toncelli | |
| 9,051,129 B2 * | 6/2015 | Rogers | B65G 47/22 |
| 2005/0219939 A1 * | 10/2005 | Christenson | B28C 7/0481 |
| | | | 366/8 |

FOREIGN PATENT DOCUMENTS

| | | | | |
|---|---|---|---|---|
| CN | 104988784 A | * | 10/2015 | |
| CN | 205329234 U | | 6/2016 | |
| CN | 106311061 A | | 1/2017 | |
| CN | 206082421 U | | 4/2017 | |
| DE | 274994 | | 6/1914 | |
| KR | 20030052726 A | | 6/2003 | |
| KR | 100773067 B1 | * | 11/2007 | .......... B01F 3/04765 |
| KR | 20150062711 A | * | 6/2015 | |

OTHER PUBLICATIONS

Google translation for KR20150062711A (Year: 2015).*
Google machine translation of CN-104988784-A (Year: 2015).*
International Search Report issued for International Patent Application No. PCT/CN2017/098474, dated Nov. 27, 2017, 6 pages including English translation.
Extended European Search Report issued for European Patent Application No. 17842898.3, dated Apr. 2, 2020, 9 pages.

* cited by examiner

METHOD FOR MANUFACTERING PRODUCT IN THE FORM OF SHEET OR BLOCK AND PRODUCTION DEVICE THEREOF

TECHNICAL FIELD

The present disclosure relates to a production method and device of a product in the form of a sheet or a block, and more particularly, to a method for manufacturing a product in the form of a sheet or a block and a production device thereof.

BACKGROUND

In order to meet the increasing aesthetic requirements of consumers and increase their market competitiveness, a product in the form of a sheet or a block is required to add more colors to the product by improving the technology, and obtain more patterns.

In the prior art, the components of the product in the form of a sheet or a block, which are generally one or more stones or stone-like granular materials having a selected particle size and binder, are initially mixed in the respective initial agitators to obtain initial mixture. Each layer of the initial mixture is deposited onto the surface of a conveyor belt in sequence such that each layer is arranged on the immediately preceding layer to form a multilayer or composite mixture structure, then the multilayer or composite mixture structure is fed through the conveyor belt to a container or support member which is rotated at a controlled speed, and subsequent compaction, hardening and the like are performed after the discharge. In this prior art, each layer of the initial mixture is superposed in sequence in a direction perpendicular to the surface of the conveyor belt, and after the layer of the latter initial mixture is deposited onto the layer of the preceding initial mixture, the preceding initial mixture cannot be improved in other technology. Once the position of each initial agitator relative to the holder of the conveyor belt (for mounting the conveyor belt) is fixed, the initial mixture component with the largest requirements of technology is definitely arranged in an initial agitator farthest from the container or support member rotated at a controlled speed to perform the preliminary processing. Other initial mixtures are gradually arranged in a direction of getting close to the container or support member rotated at a controlled speed as gradual reduction in requirements of technology. Too many restrictions on the technology arrangement are not conducive to develop new technology, and impede the progress of product upgrades.

SUMMARY

For the above defects, the main objective of the present disclosure is to provide a method for manufacturing a product in the form of a sheet or a block and a production device thereof, which truly realizes the control of the composition and addition amount of the product raw material, and is more suitable for development of the new technology, thereby improving the market competitiveness of the product.

In view of this, the above-mentioned objective is accomplished with the following technical solutions.

A method for manufacturing a product in the form of a sheet or a block is provided, the method includes: preparing an initial mixture which mainly includes one or more stones or a stone-like granular material having a selected particle size and a binder; depositing a layer of the initial mixture having a predetermined thickness onto a surface of a conveyor belt; performing prepressing and obtaining a roughly formed material; systematically depositing a plurality of layers of initial mixtures onto the surface of the conveyor belt in parallel, such that each of the layers is not superposed in a direction perpendicular to the surface of the conveyor belt, but is arranged in sequence in a direction of width of the conveyor belt to form a multi-component or composite mixture structure;

the conveyor belt conveys the multi-component or composite mixture into a rotated container or support member; after discharged from the rotated container or support member, a final mixture is conveyed to perform subsequent pre-compression and hardening.

Preferably, one or more of the layers of the initial mixtures deposited on the surface of the conveyor belt in parallel are reprocessed respectively according to respective requirement of technology by using a specific device.

Preferably, the specific device is a spouting plant or a dusting apparatus.

Preferably, an initial agitator, a primary conveyor belt, a summary conveyor belt, and a mixing agitator are included; a discharge end of the summary conveyor belt is disposed above a feed inlet of the mixing agitator;

each of initial agitators is provided with a primary conveyor belt; one or more stones or a stone-like granular material having a selected particle size and a binder are initially mixed in the initial agitator to obtain an initial mixture; the initial mixture is conveyed to the summary conveyor belt through the primary conveyor belt; the primary conveyor belts are spaced along a conveying direction of the summary conveyor belt, and the initial mixtures on different primary conveyor belts fall onto different positions on the summary conveyor belt 3 along a direction of width of the summary conveyor belt, such that each layer of the initial mixture on the surface of the summary conveyor belt 3 is not superposed in a direction perpendicular to the surface of the conveyor belt, but arranged in sequence in the direction of width of the summary conveyor belt 3 to form a multi-component or composite mixture structure.

Preferably, the primary conveyor belt is disposed above the summary conveyor belt in a direction perpendicular to a conveying direction of the summary conveyor belt, and a length of the primary conveyor belt extending along the direction of width of the summary conveyor belt is adjustable.

Preferably, a dispersing apparatus is further included; the dispersing apparatus includes a rolling brush and a driving assembly; the rolling brush is disposed above a discharge end of the primary conveyor belt and is rotated under driving of the driving assembly; the initial mixture passes through a gap between the rolling brush and the primary conveyor belt under driving of the primary conveyor belt.

Preferably, the rolling brush includes a rotating shaft and a rolling brush base; a plurality of the rolling brush bases are detachably fitted and fixed on the rotating shaft in parallel;

the rolling brush base includes a base portion and a rolling brush rod; the base portion is an annular structure that can be fitted on the rotating shaft; one end of the rolling brush rod is fixed on the annular structure, and the other end thereof extends radially outward along a radial direction of the annular structure; a plurality of the rolling brush rods are radially distributed around the annular structure.

Preferably, a side wall of an inner ring of the base portion is provided with an outwardly recessed mounting groove; an outer side wall of the rotating shaft is provided with a mounting rib which can be inserted into the mounting groove exactly, and the mounting rib extends along a longitudinal direction of the rotating shaft.

Preferably, the base portion and the rolling brush rod are jointed into integration by casting or bonding.

Preferably, the rolling brush rod is made of a non-metal material

In the present technical solution, the initial mixture discharged from each of the initial agitating and mixing apparatuses is deposited on the surface of the conveyor belt in parallel such that the layer of each initial mixture is not superposed in the direction perpendicular to the surface of the conveyor belt, and each layer of initial mixture is arranged in sequence along the direction of width of the conveyor belt. In contrast to the prior art that each layer of the initial mixture is superposed in sequence along the direction perpendicular to the surface of the conveyor belt and then conveyed to the rotated container or support member by the conveyor belt to agitate and mix, parallel deposition in the present disclosure, due to relative independence of each layer of the initial mixture, the composition ratio of each layer of the initial mixture in the final product can be flexibly adjusted at any moment, without being restricted by conditions such as installation position of the initial agitating and mixing apparatus and the like, and thereby implementing quantitatively and proportionally feeding in the true sense.

Figure 1:
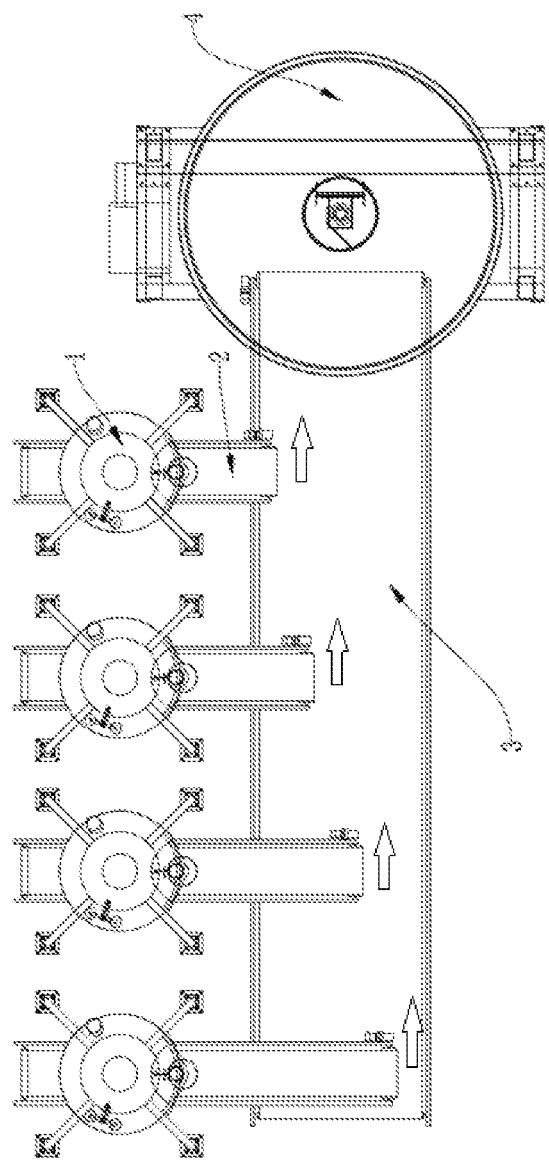
FIG. 1 is a schematic diagram of a space structure according to an embodiment of the present disclosure.

REFERENCE NUMERALS initial agitator 1, initial conveyor belt 2, summary conveyor belt 3, mixing agitator 4;
dispersing apparatus 5, rolling brush 51, rotating shaft 510, rolling brush base 511, base portion 5110, rolling brush rod 5111, mounting groove 5112, driving assembly 52; mounting rib 6.

DETAILED DESCRIPTION OF THE EMBODIMENTS

The technical solution of the present disclosure will be detailed through the following embodiments in conjunction with the accompanying drawings.

A method for manufacturing a product in the form of a sheet or a block is provided, the method includes the following steps: preparing an initial mixture mainly including one or more stones or a stone-like granular material having a selected particle size and a binder; depositing a layer of the mixture having a predetermined thickness onto a surface of the conveyor belt; performing a pre-compression step; and a final step of obtaining a roughly formed material; systematically depositing a plurality of layers of the initial mixtures onto the surface of the conveyor belt in parallel such that each of the layers is not superposed in a direction perpendicular to the surface of the conveyor belt, but are arranged in sequence along the direction of width of the conveyor belt to form a multi-component or composite mixture structure.

The multi-component or composite mixture is conveyed into a rotated container or support member by the conveyor belt, and after discharged from the rotated container or support member, a final mixture is conveyed to a subsequent pre-compression and hardening step.

The initial mixtures of different components are preliminarily uniformly mixed in respective initial agitating and mixing apparatuses, and then respectively deposited on the surface of the same conveyor belt in a predetermined thickness. The conveyor belt conveys the different initial mixtures into the rotated container or support member to sufficiently mix. Finally, a multi-component or composite mixture with uniform composition is discharged from the rotated container or support member, and sequentially conveyed to the subsequent pre-compression and hardening step to obtain a product in the form of a sheet or a block.

In the present technical solution, the initial mixture discharged from each of the initial agitating and mixing apparatuses is deposited on the surface of the conveyor belt in parallel such that each layer of the initial mixture is not superposed in the direction perpendicular to the surface of the conveyor belt, and each layer of the initial mixture is arranged in sequence along the direction of width of the conveyor belt. In contrast to the prior art that each layer of the initial mixture is superposed in sequence along the direction perpendicular to the surface of the conveyor belt and then conveyed to the rotated container or support member by the conveyor belt to agitate and mix, parallel deposition in the present disclosure, due to relative independence of each layer of the initial mixture, the composition ratio of each layer of the initial mixture in the final product can be flexibly adjusted at any moment, without being restricted by conditions such as installation position of the initial agitating and mixing apparatus and the like, and thereby implementing quantitatively and proportionally feeding in the true sense.

One or more of the layers of the initial mixtures deposited on the surface of the conveyor belt in parallel, are reprocessed respectively according to respective requirement of technology by using a specific device.

Since each layer of the initial mixture is not superposed in the direction perpendicular to the surface of the conveyor belt, one or more layers of the initial mixtures deposited on the surface of the conveyor belt in parallel can be reprocessed through a specific device of the required technology according to the requirements of the product technology, for example, a layer of an initial mixture in a certain color in the product is formed into a block, or a layer of an initial mixture is crushed, thereby facilitating the development of the new technology of the product and improving the utilization of the device.

The specific device is a spouting plant or a dusting apparatus.

It is also possible to dispose a spouting plant or a dusting apparatus above corresponding layers of the initial mixture to color the initial mixture, which simplifies the steps of production line and improves the production efficiency.

Figure 2:
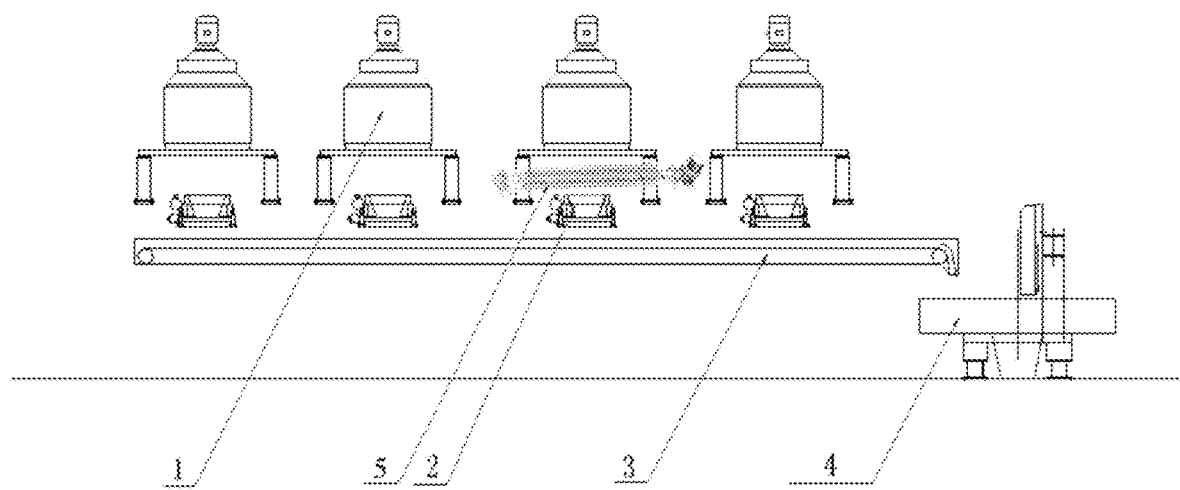
FIG. 2 is a front view thereof according to an embodiment of the present disclosure.

As shown in FIG. 1 and FIG. 2, the initial agitators 1, the primary conveyor belts 2, the summary conveyor belt 3, and the mixing agitator 4 are included, and the discharge end of the summary conveyor belt 3 is disposed above the feed inlet of the mixing agitator 4.

Each of the initial agitators 1 is provided with the primary conveyor belt 2, one or more stones or a stone-like granular material having a selected particle size and a binder are initially mixed in the initial agitator 1 and then an initial mixture is obtained. The initial mixture is conveyed to the summary conveyor belt 3 through the primary conveyor belt 2; the primary conveyor belts 2 are spaced apart from each other along the conveying direction of the summary conveyor belt 3, and the initial mixtures on different primary conveyor belts 2 falls onto different positions on the summary conveyor belt 3 along the direction of the width of the summary conveyor belt 3, such that each layer of the initial mixture on the surface of the summary conveyor belt 3 is not superposed in the direction perpendicular to the surface of the conveyor belt, but arranged in sequence in the direction of width of the summary conveyor belt 3 to form a multi-component or composite mixture structure.

Each initial mixture is separately mixed and processed in each initial agitator 1 respectively, and the operation of each initial agitator 1 does not interfere with each other. When the system is in operation, the materials in each initial agitator 1 can be controlled according to a selected technology so as to deposit each initial mixture onto the summary conveyor belt 3 regularly and quantificationally, thereby implementing flexible adjustment of the product technology, facilitating the development of the manufacturability of the product, and increasing new types of products.

Each initial agitator 1 is provided with a primary conveyor belt 2, the initial mixture is conveyed through the primary conveyor belt 2 to the summary conveyor belt 3 instead of being directly discharged from the initial agitator 1 and deposited onto the summary conveyor belt 3. During the process of conveying the initial mixture on the primary conveyor belt 2, under the action of unavoidable vibration caused by the operation of the primary conveyor belt 2, a layer of uniform and tight initial mixture is obtained, which facilitates the subsequent processing.

The primary conveyor belt 2 is disposed above the summary conveyor belt 3 in the direction perpendicular to the conveying direction of the summary conveyor belt 3, and the length thereof extending along the direction of width of the summary conveyor belt 3 is adjustable.

The initial mixture is fed from the side of the summary conveyor belt 3 through the initial conveyor belt 2, and deposited onto the summary conveyor belt 3 for ease of installation. The initial conveyor belt 2 is mounted by sliding adjustment or other movable apparatus such that the length of initial conveyor belt 2 extending along the direction of width the summary conveyor belt 3 is adjustable. Then it is possible to adjust, at any moment, the initial mixture discharged from the same mixing agitator 4 to fall onto different positions in the direction of width of the summary conveyor belt 3 according to the requirements of technology, and the initial agitator 1 with relatively fixed positions works with more flexibility and coordination when producing products with different requirements of technology.

Figure 3:
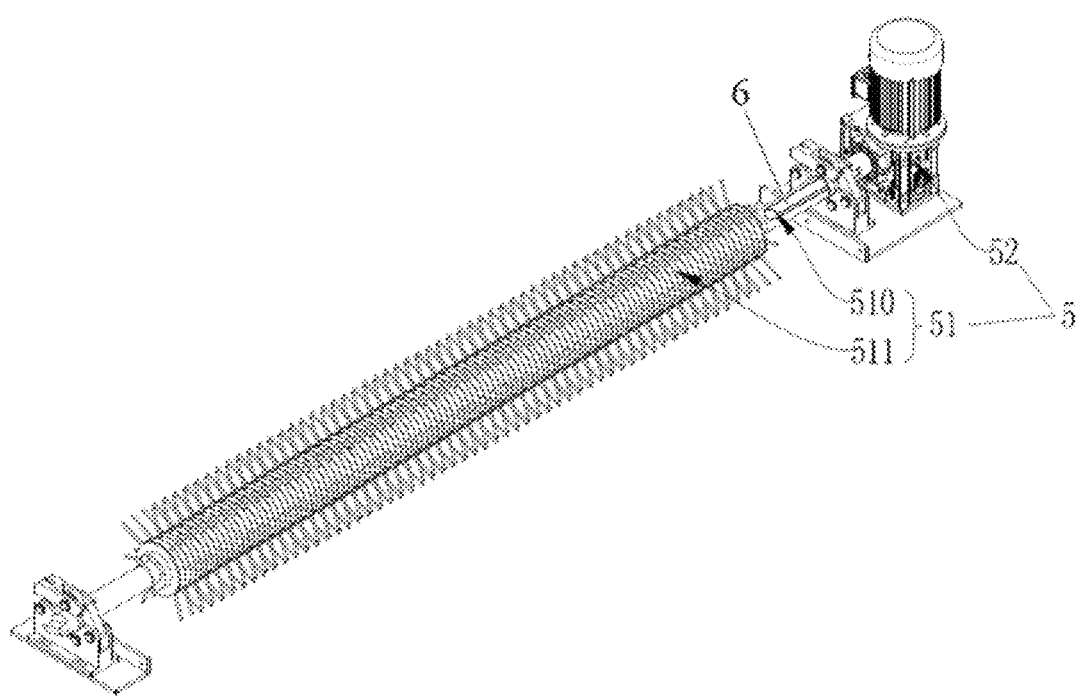
FIG. 3 is a schematic diagram of a dispersing apparatus according to an embodiment of the present invention.
Figure 4:
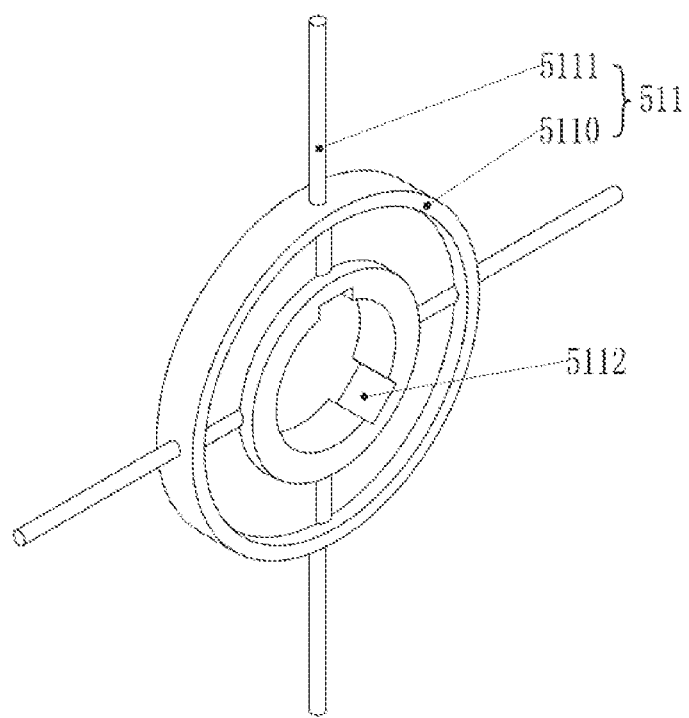
FIG. 4 is a schematic diagram of a rolling brush base according to an embodiment of the present invention.

As shown in FIGS. 3 and 4, a dispersing apparatus 5 is further included. The dispersing apparatus 5 includes a rolling brush 51 and a driving assembly 52. The rolling brush 51 is disposed above the discharge end of the primary conveyor belt 2 and is rotated under the driving of the driving assembly 52. The initial mixture passes through the gap between the rolling brush 51 and the primary conveyor belt 2 under the driving of the primary conveyor belt 2.

When entering the summary conveyor belt 3 from the primary conveyor belt 2, the initial mixture is dispersed by the rolling brush 51 driven by the driving assembly 52 in cooperation with the primary conveyor belt 2, to avoid occurrence of non-conformity large agglomerates in the initial mixture, and facilitate subsequent uniform mixing with other initial mixtures.

The rolling brush 51 includes a rotating shaft 510 and a rolling brush base 511, and a plurality of the rolling brush bases 511 are detachably fitted and fixed onto the rotating shaft 510 in parallel.

The rolling brush base 511 includes a base portion 5110 and a rolling brush rod 5111. The base portion 5110 is an annular structure that can be fitted on the rotating shaft 510. One end of the rolling brush rod 5111 is fixed on the annular structure, and the other end extends radially outward along a radial direction of the annular structure, and a plurality of the rolling brush rods 5111 are radially distributed around the annular structure.

The rolling brush 51 in this embodiment includes a rotating shaft 510 and a rolling brush base 511. The rolling brush base 511 is detachably fitted and fixed to the rotating shaft 510. When the rotating shaft 510 is rotated, the rolling brush rod 5111 is inserted into the initial mixture and agitates the initial mixture in the direction of the summary conveyor belt 3, and the process of agitating is the process of dispersing and conveying. A plurality of rolling brush bases 511 are detachably fitted and fixed on the rotating shaft 510 in parallel. In use, when the rolling brush rod 5111 on one of the rolling brush bases 511 is broken, the rolling brush base 511 with the broken rolling brush rod 5111 can be detached and replaced with a brand new rolling brush base 511, to continue to use with other good parts, thereby saving the costs, improving resource utilization, and installing and disassembling easily, and being suitable for vigorous promotion.

The side wall of the inner ring of the base portion 5110 is provided with an outwardly recessed mounting groove 5112, and the outer side wall of the rotating shaft 510 is provided with a mounting rib which can be inserted into the mounting groove exactly, and the mounting rib 6 extends along the longitudinal direction of the rotating shaft 510.

The mounting ribs 6 are disposed along the longitudinal direction of the rotating shaft 510. In this embodiment, each rotating shaft 510 is provided with two mounting ribs 6. When the rolling brush base 511 is mounted on the rotating shaft 510, the annular base portion 5110 is directly fitted to the rotating shaft 510, and the mounting ribs 6 are fitted to the mounting grooves 5110. The side wall of the mounting grooves 5112 limit the relative rotation between the rolling brush base 511 and the rotating shaft 510, and the friction between the mounting grooves 5112 and the side walls of the mounting ribs 6 limits the relative movement of the mounting groove and the mounting ribs 6 in the absence of action of too much axial external force.

The base portion 5110 and the rolling brush rod 5111 are joined into integration by casting or bonding.

The integrated structure avoids stress concentration and loss of the apparatus caused by low synchronicity of the components when rotating in a case that the components are not connected or integrated.

The rolling brush rod 5111 is made of a non-metal material.

The exclusion of metal material is to avoid producing chemical reaction when the rolling brush rod 5111 comes into contact with the initial mixture, and ensure that the product material is not affected by a material which is not technically required; and also to avoid qualitative change of the metal material such as rusting which will pollute the product material.

The technical principle of the present disclosure has been described above in conjunction with the specific embodiments. The above description is merely to illustrate the principle of the disclosure and not to be construed as limiting the scope of the present disclosure. Based on the illustration herein, those skilled in the art, without any creative work, can conceive other embodiments of the present disclosure which should also be seen in the scope of the technical solutions of the present disclosure.

What is claimed is:

1. A method for manufacturing a product in the form of a sheet or a block, comprising: preparing an initial mixture which mainly comprises one or more stones or a stone-like granular material having a selected particle size and a binder; dispersing, by a dispersing apparatus, the initial mixture before depositing a layer of the initial mixture having a predetermined thickness onto a surface of a conveyor belt; performing prepressing and obtaining a roughly formed material; wherein systematically depositing a plurality of layers of initial mixtures onto the surface of the conveyor belt in parallel, such that each of the layers is not superposed in a direction perpendicular to the surface of the conveyor belt, but arranged in sequence in a direction of width of the conveyor belt to form a multi-component or composite mixture structure;

conveying, by the conveyor belt, the multi-component or composite mixture into a rotated container or support member; after discharged from the rotated container or support member, conveying a final mixture to perform subsequent pre-compression and hardening, wherein the dispersing apparatus comprises a rolling brush and a driving assembly; the rolling brush is disposed above a discharge end of the primary conveyor belt and is rotated under driving of the driving assembly; the initial mixture passes through a gap between the rolling brush and the primary conveyor belt under driving of the primary conveyor belt;

wherein the rolling brush comprises a rotating shaft and a rolling brush base; a plurality of the rolling brush bases is detachably fitted and fixed on the rotating shaft in parallel; the rolling brush base comprises a base portion and a rolling brush rod; the base portion is an annular structure that can be fitted on the rotating shaft one end of the rolling brush rod is fixed on the annular structure, and the other end extends radially outward along a radial direction of the annular structure; and a plurality of the rolling brush rods is radially distributed around the annular structure.

2. The method for manufacturing a product in the form of a sheet or a block of claim 1, wherein one or more of the layers of the initial mixtures deposited on the surface of the conveyor belt in parallel are reprocessed respectively according to respective requirement of technology by using a specific device.

3. The method for manufacturing a product in the form of a sheet or a block of claim 2, wherein the specific device is a spouting plant or a dusting apparatus.

4. A production device for manufacturing a product in the form of a sheet or a block, wherein the production device comprises: an initial agitator, a primary conveyor belt, a summary conveyor belt, and a mixing agitator; a discharge end of the summary conveyor belt is disposed above a feed inlet of the mixing agitator;

each of initial agitators is provided with a primary conveyor belt; one or more stones or a stone-like granular material having a selected particle size and a binder are initially mixed in the initial agitator to obtain an initial mixture; the initial mixture is conveyed to the summary conveyor belt through the primary conveyor belt; primary conveyor belts are spaced apart from each other along a conveying direction of the summary conveyor belt, and the initial mixture on a different primary conveyor belt falls onto a different position on the summary conveyor belt along a direction of width of the summary conveyor belt, such that each layer of the initial mixture on the surface of the summary conveyor belt is not superposed in a direction perpendicular to the surface of the conveyor belt, but arranged in sequence in the direction of width of the summary conveyor belt to form a multi-component or composite mixture structure;

wherein the production device further comprises a dispersing apparatus; the dispersing apparatus comprises a rolling brush and a driving assembly; the rolling brush is disposed above a discharge end of the primary conveyor belt and is rotated under driving of the driving assembly; the initial mixture passes through a gap between the rolling brush and the primary conveyor belt under driving of the primary conveyor belt;

wherein the rolling brush comprises a rotating shaft and a rolling brush base; a plurality of the rolling brush bases is detachably fitted and fixed on the rotating shaft in parallel;

the rolling brush base comprises a base portion and a rolling brush rod; the base portion is an annular structure that can be fitted on the rotating shaft one end of the rolling brush rod is fixed on the annular structure, and the other end extends radially outward along a radial direction of the annular structure; a plurality of the rolling brush rods is radially distributed around the annular structure.

5. The production device of claim 4, wherein the primary conveyor belt is disposed above the summary conveyor belt in a direction perpendicular to a conveying direction of the summary conveyor belt, and a length of the primary conveyor belt extending along the direction of width of the summary conveyor belt is adjustable.

6. The production device of claim 4, wherein a side wall of an inner ring of the base portion is provided with an outwardly recessed mounting groove; an outer side wall of the rotating shaft is provided with a mounting rib which can be inserted into the mounting groove exactly, and the mounting rib extends along a longitudinal direction of the rotating shaft.

7. The production device of claim 4, wherein the base portion and the rolling brush rod are jointed into integration by casting or bonding.

8. The production device of claim 4, wherein the rolling brush rod is made of a non-metal material.

* * * * *